United States Patent [19]
Sekine et al.

[11] Patent Number: 5,655,811
[45] Date of Patent: Aug. 12, 1997

[54] FRONT FENDER REINFORCING STRUCTURE

[75] Inventors: Kousuke Sekine; Keiko Kobayashi, both of Saitama-ken, Japan

[73] Assignee: Honda Giken Kogyo Kabushiki Kaisha, Tokyo, Japan

[21] Appl. No.: 493,966

[22] Filed: Jun. 23, 1995

[30] Foreign Application Priority Data

Jul. 7, 1994 [JP] Japan .................... 6-156182

[51] Int. Cl.⁶ .................................. B62D 24/00
[52] U.S. Cl. .................. 296/198; 296/194; 296/30
[58] Field of Search .................. 296/198, 191, 296/194, 29, 30

[56] References Cited

U.S. PATENT DOCUMENTS 4,973,102  11/1990  Bien ........................... 296/198 X

FOREIGN PATENT DOCUMENTS 5624142  6/1981  Japan .
6089074  6/1985  Japan .
235180   9/1988  Japan ......................... 296/298

Primary Examiner—Joseph D. Pape
Attorney, Agent, or Firm—Weiner, Carrier & Burt, P.C.; Joseph P. Carrier; Irving M. Weiner

[57] ABSTRACT

The invention discloses a front fender reinforcing structure for automobiles. A fitting part for a clip member is formed between a body work outside panel and a plate disposed outside of the outside panel, one end of the clip member for engaging a front fender with the outside panel is fitted into the fitting part, and an opposite end of the clip member is placed and disposed at a window frame section at the rear upper part of the front fender so that the window frame section of the front fender is engaged with and held by the outside panel. Thus, the clip member is positioned between the easily deformable window frame section of the front fender and the outside panel to support the back of the easily flexible window frame section of the front fender. Consequently, the window frame section of the front fender can be prevented securely and effectively from being deformed.

20 Claims, 6 Drawing Sheets

FRONT FENDER REINFORCING STRUCTURE

BACKGROUND OF THE INVENTION

1. Field of the Invention

This invention relates to a front render reinforcing structure for automobiles, and particularly to a reinforcing structure which effectively and securely reinforces the periphery of a window positioned behind an upper part of a front fender which tends to be deformed.

2. Description of the Related Art

FIG. 7 is a perspective view of an automobile 40, particularly showing its front half part. This figure shows a front bumper 41, a hood 42, right and left front fenders 1, 1, a front grille 43, a front windshield 44, a ventilator window 31, a front wheel, and the front part of a roof 46.

A conventional front fender was mounted as shown in FIG. 6.

FIG. 6 is an explanatory view of the front part of a body work assembled according to a conventional technology. A front fender 101 has its front upper part and rear side part fixed with bolts to the body work at positions A to E. The front fender 101 is designed to conceal bolt heads from being seen from outside.

A front corner section 103 of a window frame is between the rear upper part of the front fender 101 and the bottom part of a front pillar 102. In the drawing, reference numeral 105 designates a front quarter window mounted at the front corner, and 106 a front door with a rear view mirror removed.

The front fender 101 is produced by press working. Integral forming of flanges for bolting near the corner section 103 of the front fender 101 to fix the fender to the body work is a factor to increase the production cost. Therefore, conventional front fenders are conventionally not provided with flanges.

Thus, the front corner section 103 is not fixed to the body work, resulting in a long unfixed distance between the bolting positions D and E. Therefore, the front corner section 103 may be slightly deformed. The front corner section 103 which may be deformed is hatched in FIG. 6.

This present invention has been completed to remedy the above disadvantages.

In view of the circumstances that the provision of bolting members at the easily deformable part of the front fender near the window makes the press working of the front fender complex, and the press working cost expensive, such a process cannot be adopted as a practical matter. Therefore, the inventors have given attention to a subject that the above easily deformable part shall be reinforced inexpensively without complicating the production and structure of the front fender. Since reinforcing work is required to be easy without using bolts, the front fender is needed to be produced favorably in view of molding and costs by almost the same process as before, and reinforcement must be made effectively even under the presence of dimensional errors Generated on corresponding parts of the produced body work by accommodating such dimensional errors, they have vigorously studied to meet the requirements and to solve the disadvantages totally and rationally and completed this invention.

An object of this invention is to provide a reinforcing structure which can securely and effectively prevent the deformation of a window frame part at a rear upper part of the front fender of an automobile. Another object of the invention is to provide a reinforcing structure which can reinforce securely and effectively while preventing the deformation advantageously in view of workability as well as easily accommodating the dimensional errors of the front fender and the body work. Still another object of the invention is to provide a reinforcing structure advantageous in view of costs which enables production of the front fender having almost the same structure as conventional ones, and which includes a reinforcing clip member.

SUMMARY OF THE INVENTION

This invention relates to a reinforcing structure for a front fender where a fitting part of a clip member is formed between a body work outside panel and a plate disposed outside of the outside panel, and one end of the clip member for engaging the front fender with the outside panel is engaged with the fitting part. In this front fender reinforcing structure, the clip member is positioned at the window frame section formed at the rear upper part of the front fender.

To engage the clip member with the window frame section of the front fender part, an edge part is formed on the window frame section, and a riser piece on the edge part. The clip member has a leg for elastically fitting into the fitting part which holds the clip member. It is significant that the clip member is provided with an elastic arm part and a limiting piece. They serve to elastically push the edge part and the riser piece of the front fender, and hold the edge part with another member.

The clip member is integrally made of resin or the like.

The clip member is positioned between the easily flexible window frame section of the front fender and the outside panel, the clip member supports the easily flexible window frame section of the front fender from the back, and the intervals of fixing positions of the front fender to the body work is designed short, so that bending deformation of the window frame section of the front fender can be prevented securely and effectively.

The clip member has the elastic arm part integrally formed to push the edge of the front fender toward the external direction of the body work, so that even when the positional relation between the edge and the clip member is changed due to the dimensional error of the front fender, the elastic arm part is normally sufficiently elastic to push the edge and to be able to accommodate such changes in position.

Other objects, advantages and salient features of the invention will be apparent from following Detailed Description which, when taken in conjunction with the annexed drawings, discloses a preferred embodiment of the invention.

DETAILED DESCRIPTION OF THE INVENTION

A preferred embodiment of the invention will be described in detail with reference to the attached drawings.

Figure 1:
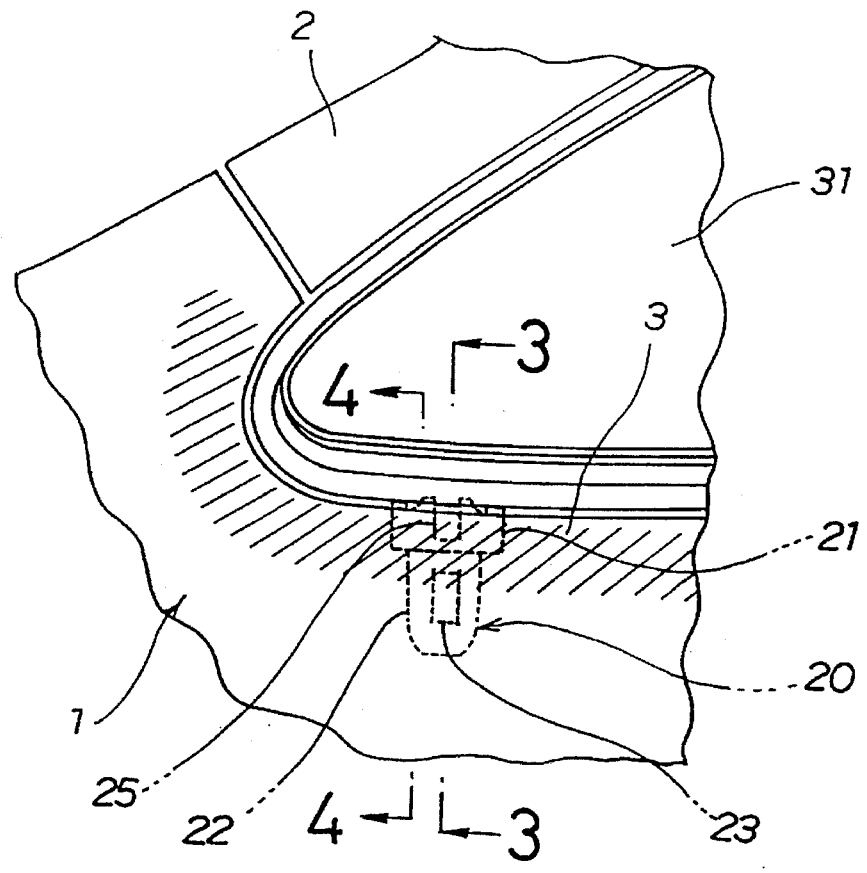
FIG. 1 is a side view showing the rear upper part of a front fender according to this invention.

FIG. 1 is a side view showing the rear upper part of a front fender according to this invention. A window frame section 3 is formed between the rear upper part of a front fender of this invention and the bottom part of a front pillar 2, and a clip member 20 is fitted to the window frame section 3. In the drawing, reference numeral 31 designates a front quarter glass fitted to the window frame.

Figure 2:
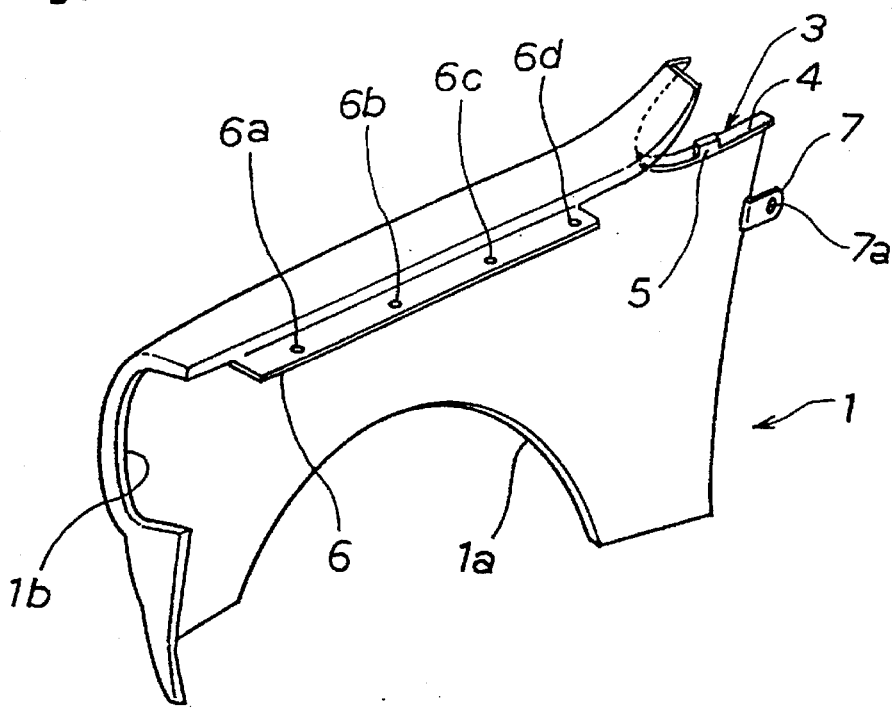
FIG. 2 is a perspective view showing a front fender whose structure is reinforced according to this invention.

FIG. 2 is a perspective view of the front fender 1, showing the inside of a front fender 1 positioned opposite to the one shown in FIG. 1.

Figure 5:
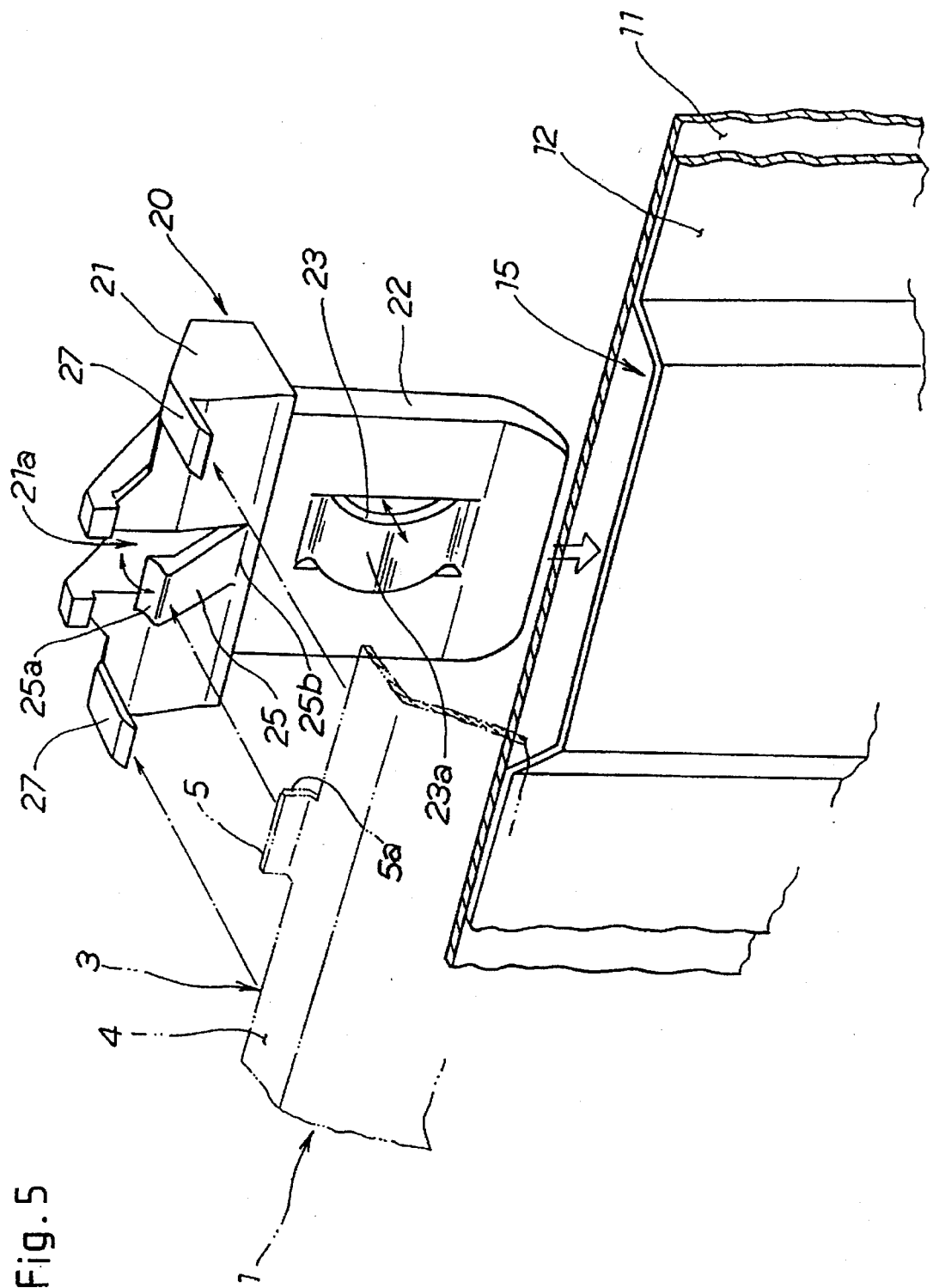
FIG. 5 is an explanatory perspective view showing a front fender reinforcing structure of this invention, with an essential part cut away, and another essential part by a phantom line.

The front fender 1 has a bent edge part 4 formed longitudinally within the window frame section 3 at the rear upper part of the fender 1. At the middle of the bent edge part 4 in the longitudinal direction, a riser piece 5 which is short longitudinally is bent to protrude upward. To the riser piece 5, the clip member 20 shown in FIG. 1 and in detail in FIG. 5 is fitted.

Reference numeral 6 designates a flange which is formed by bending the upper end of the front fender 1 to protrude toward the inside of a vehicle body or body work, and reference numeral 7 designates a stay formed at the upper part of the rear end of the front fender 1. The front fender 1 is fixed to the body work (not shown) with bolts in bolt holes 6a, 6b, 6c, 6d of the flange 6 and a bolt hole 7a of the stay 7. Reference numeral 1a designates a curved edge forming the exterior of a wheel house for a front wheel, and 1b a curved edge for mounting a head lamp.

Figure 3:
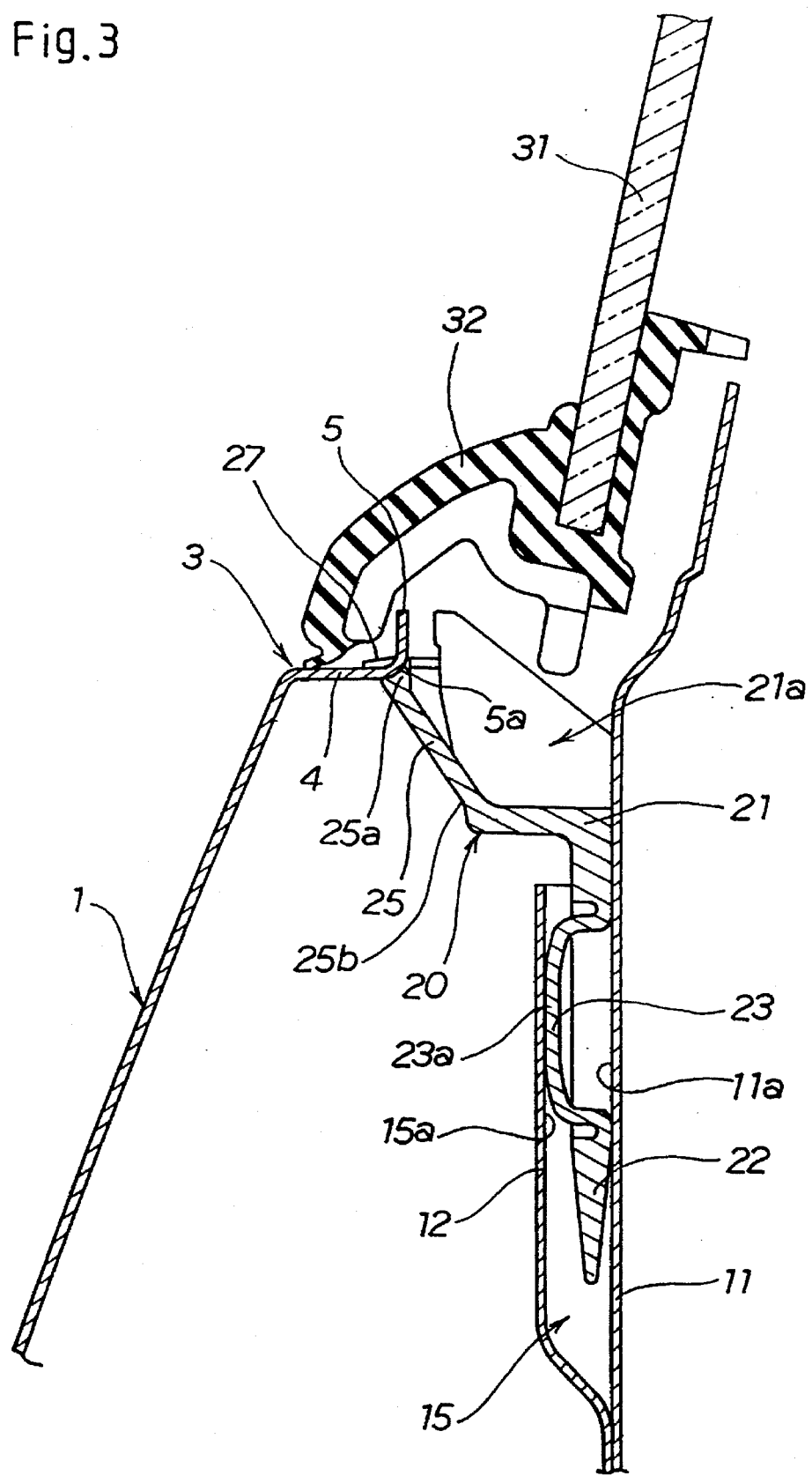
FIG. 3 is an enlarged sectional view taken on line 3—3 of FIG. 1.

FIG. 3 is an enlarged sectional view taken on line 3—3 of FIG. 1. To the exterior facing side of an outside panel 11, a wheel house upper member or plate 12 is connected. At the position of the clip member 20, a fitting part 15 which is open upward is formed between the exterior of the outside panel 11 and the wheel house upper member 12.

Specifically, a part of the top of the wheel house upper member 12 is bent outward and forms the fitting part 15, which has the form of a pocket having a width in a breadth direction of the body work, with the outside panel 11.

Figure 4:
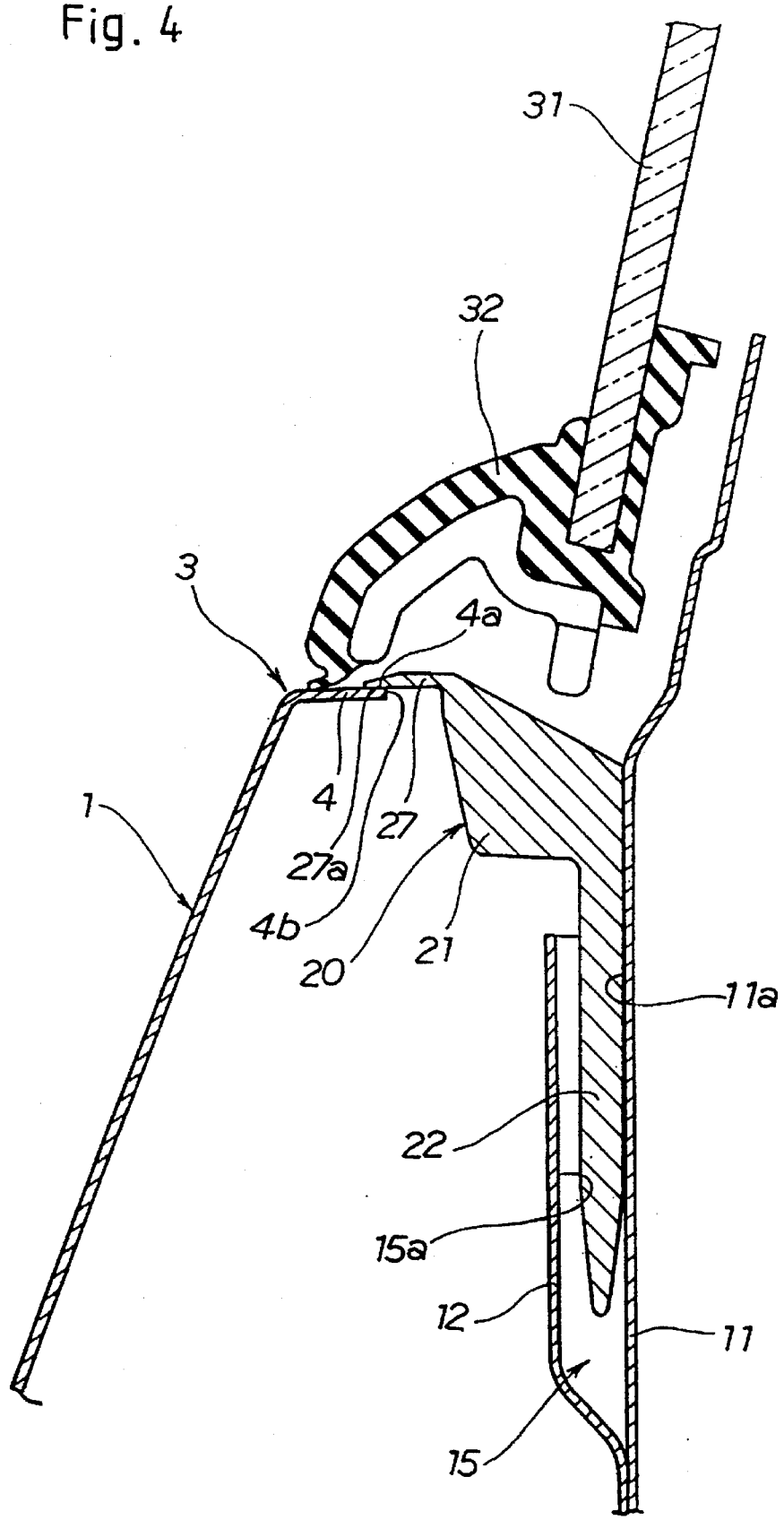
FIG. 4 is an enlarged sectional view taken on line 4—4 of FIG. 1.

The clip member 20 is as shown in FIG. 3 to FIG. 5. The clip member 20 comprises a clip body 21, a leg 22 which extends downward from the clip body 21 and fits into the fitting part 15, an elastic pressure contacting part 23 which bulges from the leg 22 toward the outside of the body work, an elastic arm part 25 which overhangs from the clip body 21 toward the outside of the body work, and a pair of limiting parts 27, 27 (only one of them is shown in FIG. 3) which project from the clip body 21 toward the outside of the body work. These parts are integrally made of resin material.

The elastic pressure contacting part 23 is formed at the middle of the leg 22 in its breadth direction and also in its vertical direction, and is a curved thin plate showing a cross section externally bulged so as to be elastically deformable. Forced contact of an external surface 23a of the elastic pressure contacting part 23 with an inside wall surface 15a of the fitting part 15 prevents the leg 22 from coming out of the fitting part 15. Loosening of the elastic pressure contacting part 23 in the fitting part 15 can also be prevented.

The elastic arm part 25 has an inverted nearly L-shaped cross section such that a bottom base end 25b is connected to the clip body 21, and a top side end 25a is externally protruded so as to be elastically deformable. The top side end 25a pushes a base end 5a (the edge of the front fender 1) of the riser piece 5 of the bent edge part 4 toward the outside of the body work.

The elastic arm part 25 is formed at the middle of the clip body 21 in the breadth direction, the elastic arm part 25 of the clip body 21 has a recess 21a formed inside, and the elastic arm part 25 can elastically deform inward and outward owing to the recess 21a behind it as indicated by an arrow in FIG. 5.

Reference numeral 32 designates a seal rubber for sealing the periphery of the window glass 31 fitted to the window frame section 3.

FIG. 4 is an enlarged sectional view taken on line 4—4 of FIG. 1.

The limiting parts 27, 27 (only one of them is shown in FIG. 4), which are disposed on both sides of the clip body 21, have the leading end of an under side 27a contacted to a upper side 4a of the bent edge part 4 of the front fender 1.

The bent edge part 4 has its upper and under sides held between the upper side end 25a (see FIG. 3) of the elastic arm part 25 and the pair of limiting parts 27, 27 to prevent the bent edge part 4 from moving vertically.

An assembling procedure of the front fender reinforcing structure configured as described above will be described with reference to FIG. 3 to FIG. 5.

FIG. 5 is an explanatory perspective view showing a front fender reinforcing structure of this invention, with an essential part cut away, and another essential part indicated by a phantom line, showing a relation among the window frame section 3 of the front fender 1, the fitting part 15, and the clip member 20.

First, the leg 22 of the clip member 20 is forced into the fitting part 15 from above against the resistance of the elastic pressure contacting part 23. The clip member 20 has the elastic pressure contacting part 23 pressure-contacted with the inside wall surface 15a of the fitting part 15, and a back face 22a of the leg 22 is pressed by a counteraction against a corresponding face 11a of the fitting part 15 configured by the outside face of the fitting part 15 of the outside panel 11. Thus, the clip member 20 is fitted into the fitting part 15.

Next, a fitting depth of the clip member 20 in the fitting part 15 is adjusted, the bent edge part 4 of the front fender 1 is aligned with the clip body 21, and a leading end 4b of the bent edge part 4 is inserted to fit an under side 27a of the each limiting part 27 (see FIG. 4). At the same time, the under face of the base end 5a of the riser piece 5 formed on the bent edge part 4 is forced against the upper end 25a of the elastic arm part 25. Thus, the elastic arm part 25 is elastically deformed backward relative to the clip body 21 (see FIG. 3).

Then, the aforementioned parts of the front fender 1 are bolted to the body work.

Thus, the bent edge part 4 of the front fender 1 is held between the top end 25a of the elastic arm part 25 and the pair of limiting parts 27, 27, and pushed outward of the body work by the elastic arm part 25.

Accordingly, the window frame section 3 of the front fender 1 is stably supported by the fitting part 15 of the outside panel 11 which is on the body work side by means of the clip member 20. The window frame section 3 of the front fender 1 has the bent edge part disposed to reach or extend toward the body work, and the hatched portion shown in FIG. 1 is backed or supported on the body work side by the clip member 20 and the fitting part 15, so that it is hardly bent nor deformed.

The above assembling procedure of the front fender reinforcing structure has been described as one example to easily understand the structure of the above embodiment, and the procedure may be changed to other given procedures.

In the present invention described in detail, the fitting part (fastening part) is provided between the outside panel of the body work and the plate on the outside of the panel, one end of the clip member for supporting the front fender with the outside panel is fitted into the fitting part, and the clip member is positioned at the window frame section at the rear upper part of the front fender. Thus, the window frame section of the front fender is stably supported by the outside panel. As a result, the clip member disposed between the easily flexible window frame section of the front fender and the outside panel supports the back of the easily flexible window frame section of the front fender. The window frame section of the front fender thus can be prevented securely and effectively from being bent or deformed.

Figure 6:
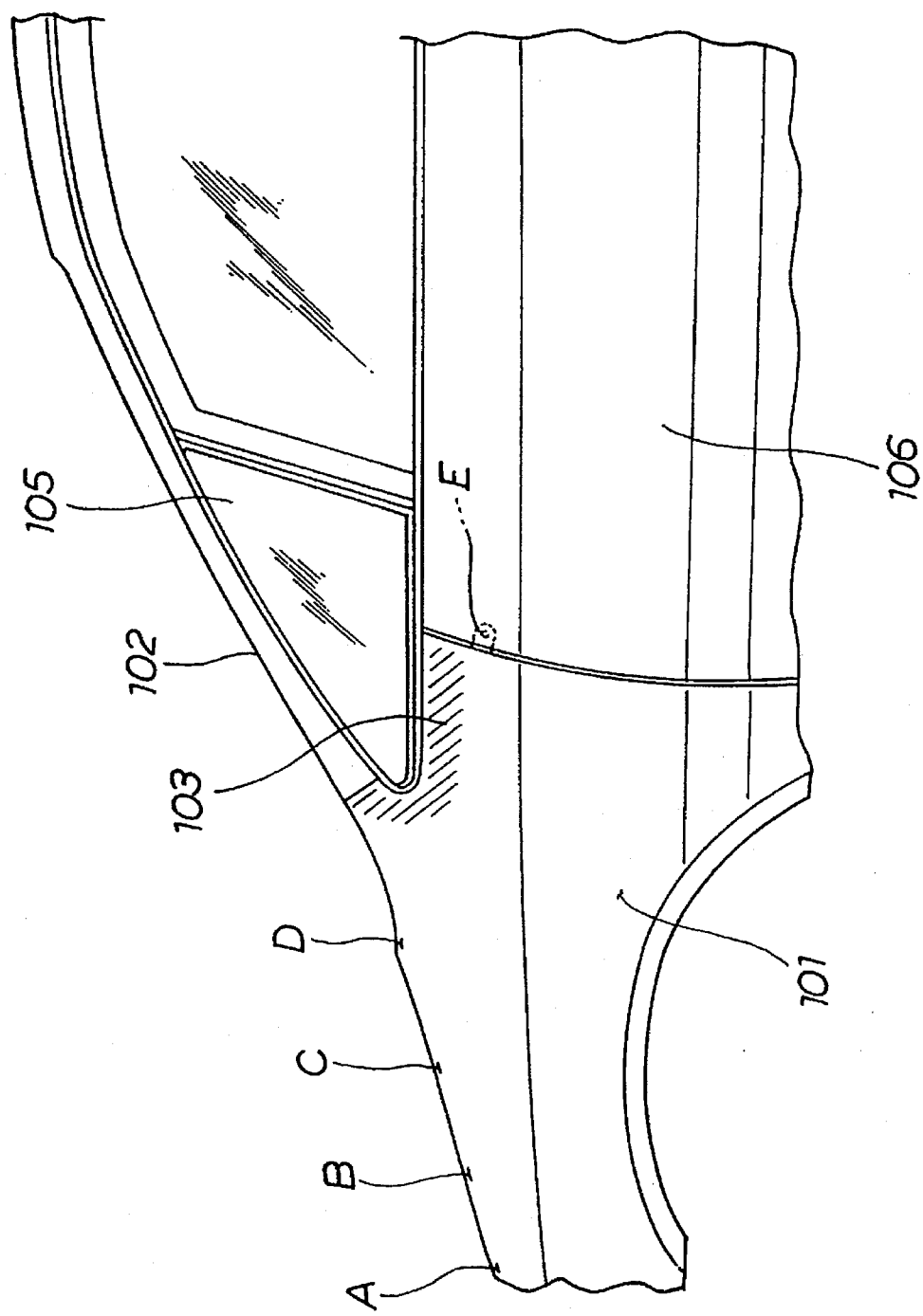
FIG. 6 is an explanatory side view showing the attachment of a conventional automobile front fender.
Figure 7:
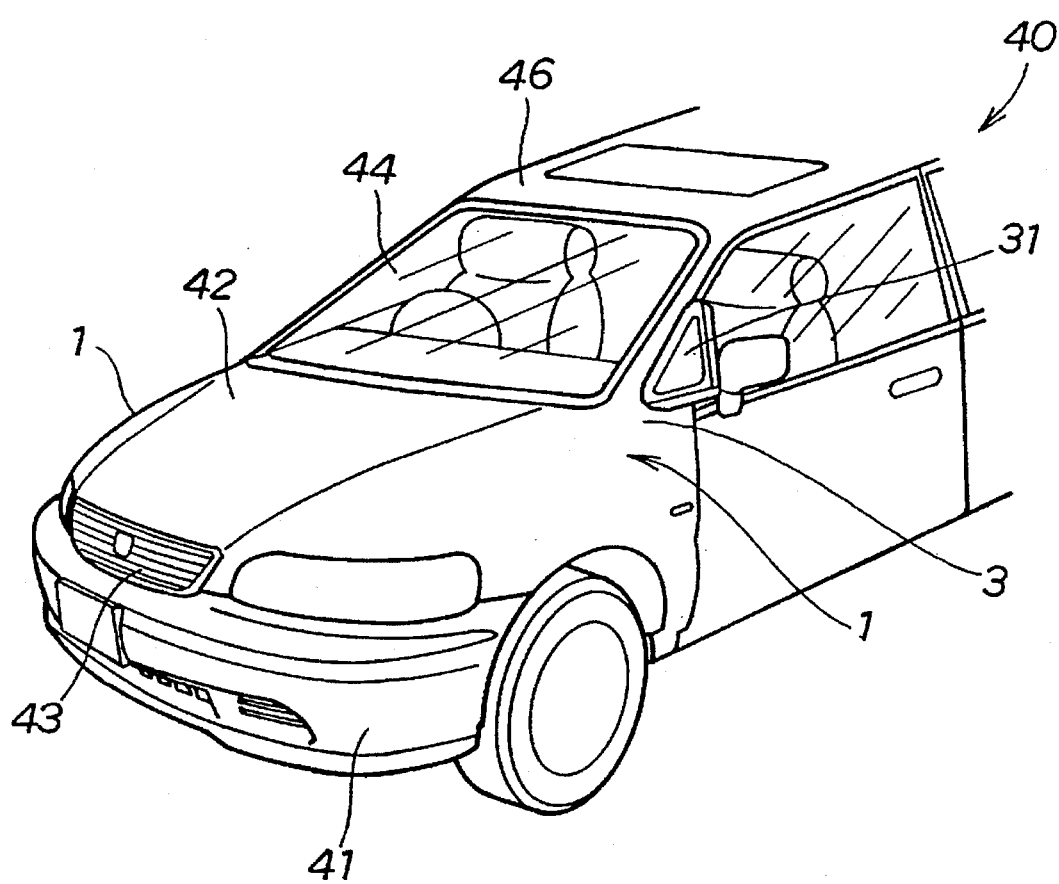
FIG. 7 is an explanatory perspective view showing one example of automobiles to which this invention is applied.

This invention engages the window frame section and the body work together by means of the clip member at the window frame section between the bolting positions D and E on the body work side of the front fender 101 shown in FIG. 6. The fitting part is securely engaged by the clip member on the window frame section at the middle of the upper corner section of the front fender apart from the attaching positions A–E where the fender is attached to the body work, so that the otherwise easily flexible window frame section of the front fender has its back reinforced by the clip member attached to the body work, and the front fender is reinforced securely and effectively with no possibility that the window frame section is deformed.

The advantageous features of this invention include the fact that without many differences from the pressed shape and structure of a conventional fender, effective reinforcement can be provided, and the reinforcing structure of the front fender itself is very advantageous in view of costs. Simple addition of the resin clip member 20, the fitting part 15 and the short riser piece 5 to the conventional structure can provide the reinforcing structure which is advantageous in view of costs in combination with the above fender structure.

The clip member has the elastic arm part integrally formed to force the edge of the front fender outward of the body work, so that even when the positional relation between the edge and the clip member is changed due to the dimensional error in production of the front fender or the dimensional error in assembling, the elastic arm part is normally sufficiently elastic to push the edge and to be able to accommodate such changes in position. Therefore, assembling is easy, and the clip member can be exactly fitted to the required part while accommodating the dimensional error, thus simply ensuring proper reinforcement of the front fender.

Besides, the clip member can be attached easily to the body work by fitting or sliding its leg into the fitting part on the body work side, and can be easily attached to the window frame section 3 through the engagement of the elastic arm part and the limiting parts with the bent edge part of the window frame section making the fitting work very simple. This invention also excels in workability on the above points.

In addition to the above, the clip member can have each of its parts integrally made of resin as a single unitary member, so that a functionally excellent clip member can be produced easily. Although there has been described what is at present considered to be preferred embodiment of the invention, it will be understood that variations and modifications may be made thereto without departing from the spirit or essence of the invention. The scope of the invention is indicated by the appended claims rather than by the foregoing description.

What is claimed is:

1. A reinforcing structure for a vehicle body front fender having a window frame section at an upper rear portion thereof, the reinforcing structure comprising:
   an outer panel of the vehicle body disposed inwardly of the vehicle body relative to the front fender;
   a plate disposed adjacent to the panel and defining a fitting part therebetween; and
   a clip member having one end thereof in engagement with the fitting part and a portion of the clip member is fitted to the window frame section of the rear upper part of the front fender, for thereby supporting or reinforcing the front fender with the outer panel.

2. A front fender reinforcing structure according to claim 1, wherein the fitting part is bulged outward and open upward to define a pocket, and the one end of the clip member is fitted into the pocket to fix the clip member to the vehicle body.

3. A front fender reinforcing structure according to claim 1, wherein a bent edge part which is bent inward of the vehicle body is formed at the window frame section of the front fender, a riser piece which protrudes upward is formed on a part of the bent edge part, and a plurality of parts of the clip member engage with the bent edge part and the riser piece.

4. A front fender reinforcing structure according to claim 2, wherein the clip member is provided with a leg which fits into the pocket, the leg has an elastic pressure contacting part which elastically bulges outward, and the leg is elastically held within the pocket by elastic action of the elastic pressure contacting part of the leg.

5. A front fender reinforcing structure according to claim 1, wherein the window frame section of the front fender includes a bent edge part bent inwardly of the body work and the clip member is integrally produced with an elastic arm part which presses the bent edge part of the front fender outward of the vehicle body.

6. A front fender reinforcing structure according to claim 2, wherein the clip member includes a leg elastically fitted into the pocket and a body section disposed above the leg with an elastic arm part and limiting parts, and the reinforcing structure comprises a bent edge part which is formed at the window frame section of the front fender with a riser piece extending upward from the bent edge part, the elastic arm part which is engaged with the riser piece, and the limiting parts.

7. A front fender reinforcing structure according to claim 6, wherein the limiting parts push an upper side of the bent edge part, the elastic arm part pushes an the under side of the riser piece, and the bent edge part including the riser piece is held between the limiting parts of the clip member and the elastic arm part.

8. A front fender reinforcing structure according to claim 7, wherein the clip member is integrally formed as a unitary member.

9. A front fender reinforcing structure according to claim 3, wherein the clip member includes a leg elastically fitted into the pocket and a body section disposed above the leg with an elastic arm part and limiting parts, and the reinforcing structure comprises the bent edge part, with the riser piece, the elastic arm part which is engaged with the riser piece, and the limiting parts.

10. A front fender reinforcing structure according to claim 9, wherein the limiting parts push an upper side of the bent edge part, the elastic arm part pushes an under side of the riser piece, and the bent edge part including the riser piece is held between the limiting parts and the elastic arm part of the clip member.

11. A front fender reinforcing structure according to claim 10, wherein the clip member is integrally formed as a single, unitary member.

12. A front fender reinforcing structure according to claim 5, wherein the clip member includes a leg elastically fitted into the pocket and a body section disposed above the leg, said body section including said elastic arm part and limiting parts, and the reinforcing structure comprises the bent edge part which is formed at the window frame section of the front fender with a riser piece extending upward therefrom, the elastic arm part which is engaged with the riser piece, and the limiting parts.

13. A front fender reinforcing structure according to claim 12, wherein the limiting parts push an upper side of the bent edge part, the elastic arm part pushes an under side of the riser piece, and the bent edge part including the riser piece is held between the limiting parts of the clip member and the elastic arm part.

14. A front fender reinforcing structure according to claim 13, where the clip member is integrally formed as a single, unitary member.

15. A reinforcing structure of a vehicle body from fender having a window frame section with a bent edge part at a rear upper portion thereof, the reinforcing structure comprising:

the bent edge part of the window frame section of the front fender;

an outer panel of the vehicle body disposed inwardly of the front fender relative to the vehicle body;

a support plate disposed on the outer panel so as to define a fitting part therebetween; and clip means for being disposed between the bent edge part and the fitting part to reinforce the bent edge part against the outer panel.

16. A front fender reinforcing structure according to claim 15, wherein said clip means includes a leg portion securely fitted to said fitting part and a body portion with projections which respectively engage upper and lower sides of the bent edge part to prevent the bent edge part from moving vertically.

17. A front fender reinforcing structure according to claim 15, wherein said bent edge part includes a riser piece projecting therefrom and said clip means includes an elastic arm part which engages the riser piece to elastically push the bent edge part outwardly of the vehicle body.

18. A front fender reinforcing structure according to claim 17, further including a limiting member which engages an upper surface of said bent edge part, and said elastic arm part engages a lower surface of said riser piece so as to cooperate with the limiting member to prevent the edge part from moving vertically.

19. A front fender reinforcing structure according to claim 15, wherein said fitting part is a pocket which opens upwardly, said clip means includes a lower portion slidably received in said pocket, and said lower portion includes biasing means for securely maintaining the lower portion in said pocket.

20. A front fender reinforcing structure according to claim 15, wherein said clip means is a clip member having respective portions which securely engage said fitting part and said bent edge part through pressing contact, and said clip member is integrally formed as a unitary member from resin.

* * * * *

UNITED STATES PATENT AND TRADEMARK OFFICE
CERTIFICATE OF CORRECTION

PATENT NO.   : 5,655,811
DATED        : 12 August 1997
INVENTOR(S)  : Kousuke Sekine, Keiko Kobayashi It is certified that error appears in the above-indentified patent and that said Letters Patent is hereby corrected as shown below:

On the cover page, under the heading "References Cited", for the final document cited, change "296/298" to --296/198--.

Column 1, line 6, change "render" to --fender--;
          line 59, change "Generated" to --generated--.

Column 2, line 48, before "following" insert --the--;
          lines 48-49, change "Detailed Description" to --detailed description--.

Column 4, line 23, change "a upper" to --an upper--;
          line numbered between 49 and 50, delete "the" (second occurrence only).

Column 5, line numbered between 30 and 31, after "fender" insert --1--;
          line 65, after "section" insert a comma.

Column 6, line 4, after "easily." begin a new paragraph;
          line 5, before "preferred" insert --the--;
          line 59, change "an the" to --an--.

Signed and Sealed this

Seventeenth Day of March, 1998

Attest:

BRUCE LEHMAN

Attesting Officer

Commissioner of Patents and Trademarks